United States Patent
Harvey

(10) Patent No.: US 6,762,584 B2
(45) Date of Patent: *Jul. 13, 2004

(54) RECHARGER FOR USE WITH A PORTABLE ELECTRONIC DEVICE AND WHICH INCLUDES A CONNECTOR TERMINUS FOR COMMUNICATING DIRECTLY WITH RECHARGEABLE BATTERIES CONTAINED WITHIN THE DEVICE

(76) Inventor: Thomas Patrick Harvey, 1603 W. Lake Dr., Novi, MI (US) 48377

( * ) Notice: Subject to any disclaimer, the term of this patent is extended or adjusted under 35 U.S.C. 154(b) by 105 days.

This patent is subject to a terminal disclaimer.

(21) Appl. No.: 10/124,496

(22) Filed: Apr. 17, 2002

(65) Prior Publication Data

US 2002/0149344 A1 Oct. 17, 2002

Related U.S. Application Data

(60) Provisional application No. 60/284,370, filed on Apr. 17, 2001.

(51) Int. Cl.$^7$ .................................... H01M 10/46
(52) U.S. Cl. ........................................ 320/107
(58) Field of Search ............................ 320/107, 110, 320/112, 113, 114, 115, 111

(56) References Cited

U.S. PATENT DOCUMENTS

| | | | |
|---|---|---|---|
| 4,998,055 A | 3/1991 | Nash et al. ............... 320/2 |
| 5,146,149 A | * 9/1992 | Nilssen | |
| 5,602,455 A | 2/1997 | Stephens et al. ........ 320/2 |
| 5,621,299 A | 4/1997 | Krall ......................... 320/5 |
| 5,646,505 A | 7/1997 | Melnikov et al. ...... 320/21 |
| 5,648,712 A | * 7/1997 | Hahn | |
| 5,736,830 A | * 4/1998 | Weng | |
| 5,861,729 A | 1/1999 | Maeda et al. .......... 320/106 |
| 5,889,382 A | 3/1999 | Jung ....................... 320/106 |
| 5,920,178 A | * 7/1999 | Robertson, Jr. et al. | |
| 6,008,620 A | 12/1999 | Nagano et al. ........ 320/106 |
| 6,075,347 A | 6/2000 | Sakakibara ............. 320/150 |
| 6,104,167 A | 8/2000 | Bertness et al. ....... 320/132 |
| 6,204,640 B1 | 3/2001 | Sakakibara ............. 320/150 |
| 6,204,641 B1 | 3/2001 | Sakakibara ............. 320/153 |
| 6,281,425 B1 | 8/2001 | Price ....................... 136/244 |
| 6,304,060 B1 | 10/2001 | Dernehl ................. 320/132 |
| 6,316,911 B1 | 11/2001 | Moskowitz et al. .... 320/114 |
| 6,331,761 B1 | 12/2001 | Kumar et al. .......... 320/132 |
| 6,555,990 B1 | * 4/2003 | Yang | |
| 6,563,713 B2 | * 5/2003 | Yang | |
| 2001/0009362 A1 | 7/2001 | Sakakibara ............. 320/150 |
| 2001/0048289 A1 | 12/2001 | Sakakibara ............. 320/150 |

* cited by examiner

*Primary Examiner*—Edward H. Tso
(74) *Attorney, Agent, or Firm*—Gifford, Krass, Groh, Sprinkle, Anderson & Citkowski, P.C.

(57) ABSTRACT

The present invention provides an electronic device recharger that has utility in converting a portable electronic device from disposable battery power to rechargeable battery power without resort to modification of the device circuitry. The recharger includes a power adapter, a recharger terminal, a battery pack and a replacement battery cover. To utilize the recharger as according to the invention, the device battery cover and the disposable batteries are removed from the device and replaced with the battery pack and the replacement battery cover. The power adapter is plugged into the wall and the connector terminus is plugged into the battery pack through apertures formed in the replacement battery cover. The power adapter and connector terminus are in electrical communication such that the power adapter provides conditioned power to the connector terminus which in turn provides power to the battery pack and the device. A light emitting device is provided on the connector terminus and indicates the charging status of the battery pack.

24 Claims, 3 Drawing Sheets

RECHARGER FOR USE WITH A PORTABLE ELECTRONIC DEVICE AND WHICH INCLUDES A CONNECTOR TERMINUS FOR COMMUNICATING DIRECTLY WITH RECHARGEABLE BATTERIES CONTAINED WITHIN THE DEVICE

RELATED APPLICATION

This application claims priority of U.S. Provisional Patent Application No. 60/284,370 filed Apr. 17, 2001 and is incorporated herein by reference.

FIELD OF THE INVENTION

The present invention relates to recharging of portable electronic devices in general, and more particularly, to retro devices powered by disposable alkaline batteries with a system in which the replacement battery need never be removed from the device.

BACKGROUND OF THE INVENTION

Many low cost portable electronic devices such as handheld computers, handheld electronic game systems, and microcassette recorders are powered by disposable batteries. These devices powered by disposable batteries always are susceptible to power loss at inopportune moments. Portable electronic devices intended for recharging must be engineered to incorporate circuitry for assuring that in-device battery recharge will not damage the device proper. Alternatively, rechargeable batteries are removed from the device for recharging. In the former instance, the additional circuitry to monitor in-device recharging adds expense and complexity and thereby makes retrofitting of a device intended for use with disposable batteries both difficult and cumbersome. Removing batteries for recharge disrupts device usage and causes excessive device wear. Thus, there exists a need for a portable electronic device recharger capable of retrofitting into a device intended to be powered by disposable batteries that obviates the necessity of modifying the device proper.

SUMMARY OF THE INVENTION

An electronic device having a battery compartment, a battery compartment cover and a disposable battery is the subject environment of the invention.

Generally, a power source adapter is provided to condition the power to be utilized by the electronic device. The adapter may include a transformer and converter that each act on the source power to adapt it for use by the subject device. An electrical conductor connects to the power adapter in a manner that allows the power adapter to be in electrical communication with a device connected to the opposite end of the conductor. A connector terminus having a terminal housing that includes a charging control circuit is connected to the electrical conductor at an end opposite the power adapter. The terminus includes an indicator light emitting device whereby the user of the recharger can determine the charging state of the device by the illumination state of the light emitting device.

A battery pack includes at least one rechargeable battery that includes at least one connector terminus coupling that replaces the disposable battery contained within the electronic device's battery compartment. A replacement battery compartment cover having a throughhole that allows the connector terminus coupling to be coupled to the connector terminus when the replacement battery cover is fitted to the device. In one embodiment, the cover is independent of electrical contacts. To convert a portable electronic device from disposable battery power to rechargeable battery power, the user removes the battery compartment cover and replaces the disposable batteries with the rechargeable battery pack that includes the terminus coupling. The replacement battery compartment cover is installed such that the throughholes are in alignment with the terminus coupling of the battery pack to permit coupling with the connector terminus. In another embodiment the cover is flush with the rear panel of the portable device. The power adapter of the recharger is connected to a power source whereby the transformer/converter circuitry conditions the power for use by the electronic device. The connector terminus is then connected to the terminus coupling through the replacement battery compartment cover to begin the charging process.

During charging, the light emitting device on the connector terminus flashes at a steady frequency as an indication that normal charging is occurring. When the rechargeable battery has obtained its maximum charging capacity, the light emitting device stops flashing and remains on at a steady state condition. However, once the rechargeable battery has reached its capacity and the electronic device is operated while the recharger is still attached, the light emitting device will occasionally flash as an indication that the power being expended from the batteries is being replaced on a periodic basis.

From the foregoing, a portable electronic device recharger is provided having a charging status indicating terminus for use in converting a device from portable disposable battery power to rechargeable battery power without resort to modification of the device circuitry.

DETAILED DESCRIPTION OF THE PREFERRED EMBODIMENT

The present invention provides a portable electronic device recharger capable of being retrofit to a device designed to be powered by disposable batteries. The present invention provides a portable electronic device recharger that has utility in converting portable electronic devices from disposable battery power to rechargeable battery power without resort to modification of device circuitry.

It is appreciated that inventive components included in the portable electronic device recharger as detailed herein are readily shifted in location between invention element structures of power source adapter, connector terminus and the battery. However, as illustrated in the following preferred embodiment, the connector terminus includes the inventive structures, and most particularly, a charge status indicating light source.

As used herein "light emitting device" is defined to include a component that emits light upon being energized, and includes a light emitting diode, incandescent bulb, and a light emitting polymer.

Figure 1:
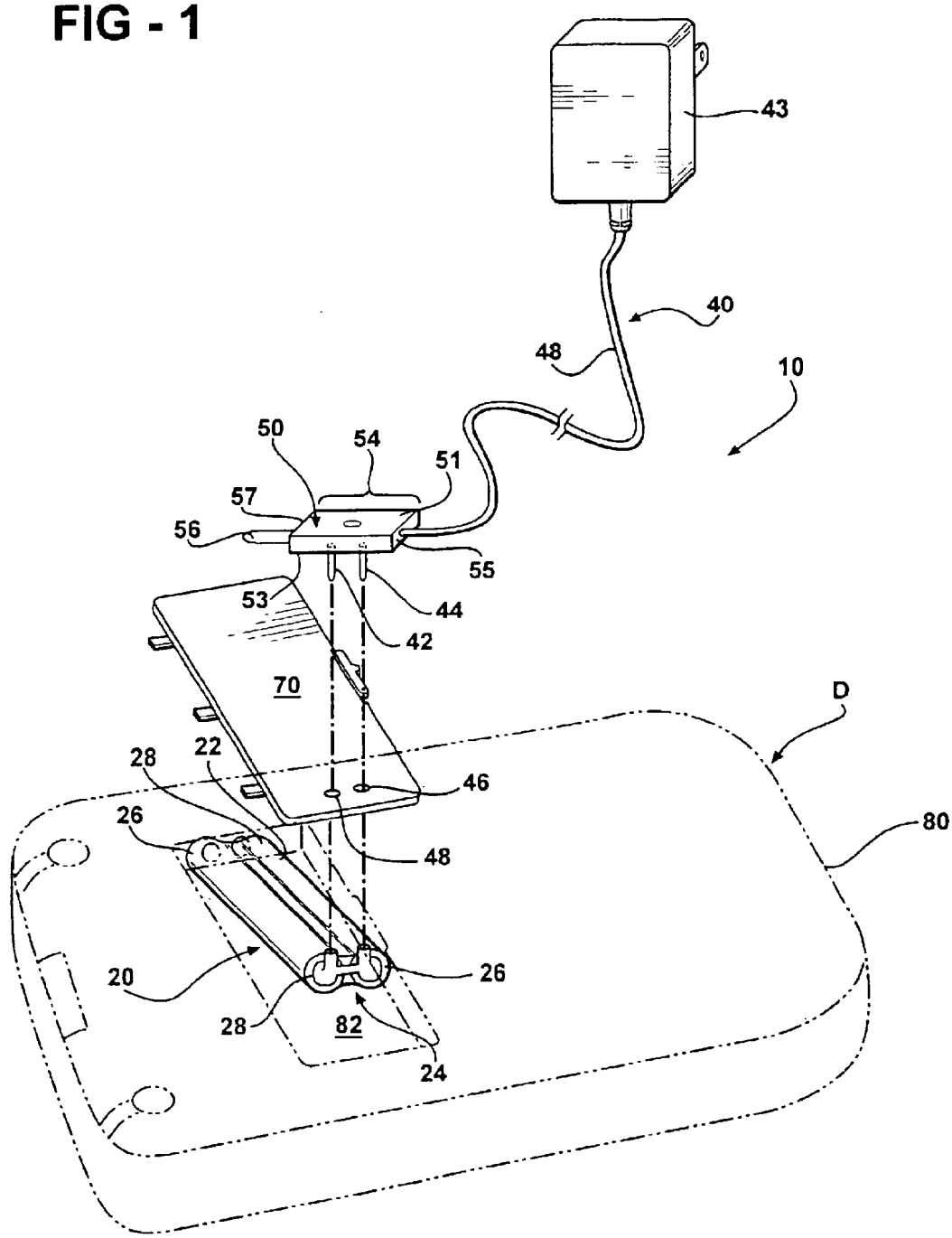
FIG. 1 is an exploded view of a recharger according to the present invention, the device depicted in phantom.

As illustrated in FIG. 1, a portable electronic device recharger 10 is generally shown for use with an electronic device D having disposable batteries (not shown), a battery compartment 82 and a battery compartment cover (not shown).

A power adapter 40 includes a transformer and converter portion 43, an electrical conductor cord 48 and a connector terminus 50.

The transformer/converter 43 engages a conventional power source and adapts the raw power to the specific power requirements of the charger control circuitry of the device recharger 10, which in turn meters power to the portable device D. An electrical power source according to the present invention is appreciated to illustratively include line current, a vehicle electrical system or solar energy. In this instance the electrical energy source is line power, namely 120 volts AC at 60 hertz, and a conventional transformer/converter 43 is coupled thereto. The transformer/converter 43 reduces the line voltage to a predetermined value typically ranging from 1 to 36 volts DC and preferably 5 volts DC. The transformer/converter 43 may be adapted for use with European line source power which is typically 220 volts at 50 hertz AC.

An electrical conductor cord 48 is attached to, and extends from, the transformer/converter 43 which allows for the device D to be in electrical communication with the transformer/converter 43 when attached to the opposite end of the conductor 48. Preferably, the conductor 48 is of a twin lead 20 AWG, but other types of conductors may be used without exceeding the scope of the invention.

A connector terminus 50 is in electrical communication with the electrical conductor 48 at its opposite end from the transformer/converter 43. The connector terminus 50 provides a terminal housing 54 and a charging control circuit therein that includes a charging status indicating light source 60.

The terminal housing 54 includes a top face 51, a bottom face 53, a first end 55 and a second end 57. The electrical cord that extends from the transformer/converter 43 attaches to the first end 55 of the terminal housing 54 whereby conditioned electrical power is provided to the charging control circuit therein. It is appreciated that the housing 54 herein is merely illustrative as other configurations may be employed without exceeding the scope of the invention such as a coaxial connector or the like.

In a preferred embodiment, the second end 57 is flared relative to the first end 55 to form a grip surface. Alternatively, it is appreciated that a pull tab 56 may extend from the second end 57 of the terminal housing 54 for grasping and disconnecting the terminal housing 54 from a device D.

The terminal housing 54 is electrically insulated with electrical charging contacts 42 and 44 extending normal to the bottom face 53 of the terminal housing thus being the only electrical conductor portions extending from the charging control circuit (not shown). In the preferred embodiment, the charger contacts are male pins but alternatively may be female sockets for electrically coupling to the device D.

The connector terminus 50 has a light emitting device 60 visible at the top face 51 of the housing 54. Preferably, the light emitting device is a light emitting diode (LED). It is appreciated that the type and position of the light emitting device 60 on the terminus 50 is herein merely illustrative as other types and positions may be employed without exceeding the scope of the invention. It is appreciated that there are several modes by which a light emitting device communicates information, these modes include temporal variations in activation frequency, color, and intensity of patterns defined by single or multiple light emitting devices. Further, the connector terminus 50 is designed to couple to the device D in a plug and socket fashion, coaxially or the like, and does not cradle or receive the device D in a docking fashion. In the preferred embodiment, the mass of the terminus 50 is small relative to that of the device D and attaches such that a user can grasp, hold and operate the device as normal limited only by the length of the conductor 48.

A battery pack 20 is receivable within the battery compartment 82 of the portable device D. The battery pack 20 is configured to be electrically coupled to the device D in a manner similar to the disposable batteries that have been replaced by the present invention. The battery pack 20 includes at least one rechargeable cell 22 but as illustratively shown in FIG. 1, the battery pack 20 containing two cells 22 are oriented with adjacent opposing poles 26 and 28 respectively. A rechargeable cell 22 according to the invention illustratively includes nickel metal hydride, nickel cadmium, lithium and polymeric cells.

A terminus coupling 24 is in electrical contact with the adjacent opposing poles 26 and 28 respectively of the cells 22. The coupling 24 receives complementary electrical contacts 42 and 44 from the connector terminus 50. As such, the terminus coupling 24 is a pair of matable sockets electrically coupled only through the cell 22 and capable of receiving electrical contacts 42 and 44. Here again, it is appreciated that the terminus coupling 24 and the complementary electrical contacts may be inverted such that the terminus coupling 24 is a male type adapted to couple with a complementary female type of the electrical contacts. A terminus coupling 24 is likewise half of a matable pair of coaxially located flat blades.

The battery pack 20 spans the battery compartment to electrically communicate with the battery contacts of the device D. Based on the recharger cell 22 dimensions, a spacer (not shown) may be provided to bridge the distance between the distal poles of the battery cell 22 and the contacts of the device D.

Charger control circuitry (not shown) is enclosed within the connector terminus 50 and operates to regulate the flow of charging current to the battery pack 20 while controlling the indicator light emitting device 60. The charger control circuit senses the presence of the battery pack 20 and the installation of the battery pack 20 within a device D prior to passing current thereto. Further, the circuitry assures proper orientation between the charger contacts 42 and 44 with the respectively complementary terminus coupling 24. Still further, the control circuitry determines the ability of the battery 22 to withstand charging through measurement of the terminal voltage. It is appreciated that the charging process is optionally monitored by independent or simultaneous measurement of parameters including voltage, charging current, battery temperature, or charging duration. In a preferred embodiment, charging voltage is measured.

Provided such conditions of contact orientation and battery chargeability are met, the light emitting device 60 begins to flash steadily to indicate charging as current flows to the battery pack 20 and therefore to the device D. The device D can operate during charging with surplus current flowing to charge the battery pack 20. The preferred embodiment includes a single indicator light emitting device 60, however a plurality of light emitting devices may be employed in the present invention without exceeding its scope.

Charging current is controlled while the voltage is being monitored. Optionally, thermal monitoring of the battery pack 20 also may be accomplished by integrating a thermistor, or equivalent component into the control circuitry.

Intermediate between the charger contacts 42 and 44 and the coupling 24 of the battery pack 20, a battery compartment cover 70 is provided having through holes 46 and 48 therein dimensioned such that contacts 42 and 44 penetrate therethrough in order to contact coupling 24. In this case, the throughholes in the cover 70 establish a coupling point that allows the connector terminus 50 to couple to the battery pack 20.

The cover 70 is preferably formed of injection molded thermoplastic material or a material similar to that from which the original device cover is formed. More preferably, the cover 70 is formed of a transparent thermoplastic thereby affording visual confirmation that an inventive battery pack 20 is located within the device D. Most preferably the cover is formed so as to lie flush with the rearward panel of the portable device D. In another embodiment, the cover is formed independent of electrical contacts integral therewith and instead only has apertures through which the battery pack and contacts communicate.

Figure 2:
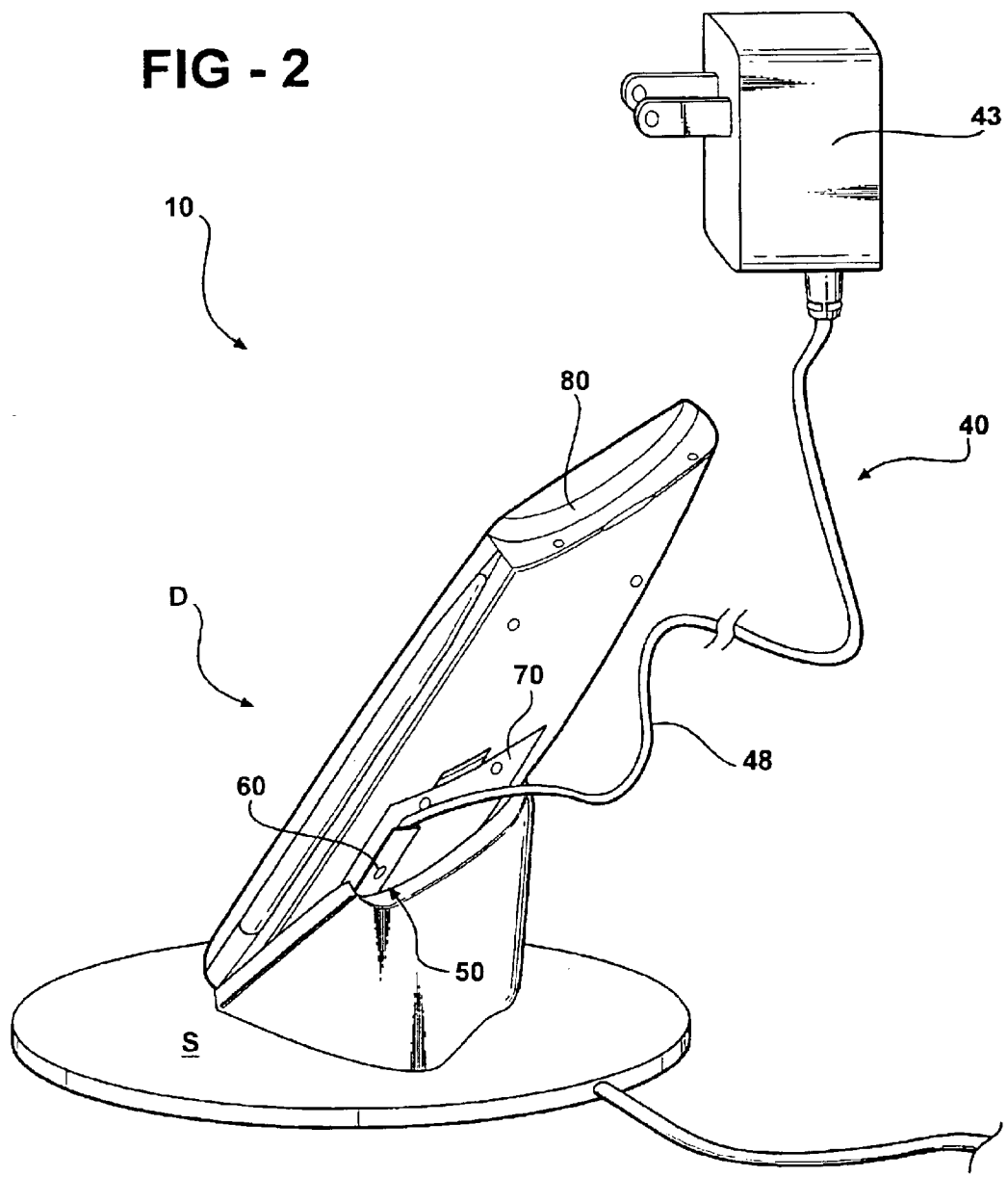
FIG. 2 is an illustrative view of a recharger according to the invention having its connector terminus coupled to a device mounted in its docking station.

In the preferred embodiment and as best illustrated in FIG. 2, the connector terminus 50 and the electrical conductor 48 extend toward a top end 80 of the device D from the battery compartment 82 where like numerals refer to those used with respect to FIG. 1. In this configuration, the inventive recharger 10 accommodates ambidextrous device usage while coupled to the recharger while still affording the device to be mounted within a docking station S.

The de-coupling of the connector terminus 50 from the device D may be facilitated by the tab 56 extending from the second end 57 of the terminal housing 54. However, in the preferred embodiment the terminal housing 54 is flared in width near the terminus thereof and decreases in thickness to form a gripping point from which the contacts 42 and 44 can be decoupled from the coupling 24 of the battery pack 20.

The control circuitry within the connector terminus 50 assures that no voltage is on the contacts 42 and 44 when such contacts are not properly coupled to the coupling 24.

In an alternative embodiment of the present invention (not shown), the control circuitry and the charge indicating light emitting device 60 are incorporated into a battery pack 20. In such an embodiment, a battery compartment cover is provided to allow visual sensing of the light emitting device charging status either through the use of a transparent cover or having an aperture therein through which the light emitting device extends. In this case a conventional power adapter is then coupled to the battery pack incorporating the control circuitry and indicator light emitting device through an appropriate aperture in the battery compartment cover.

Figure 3:
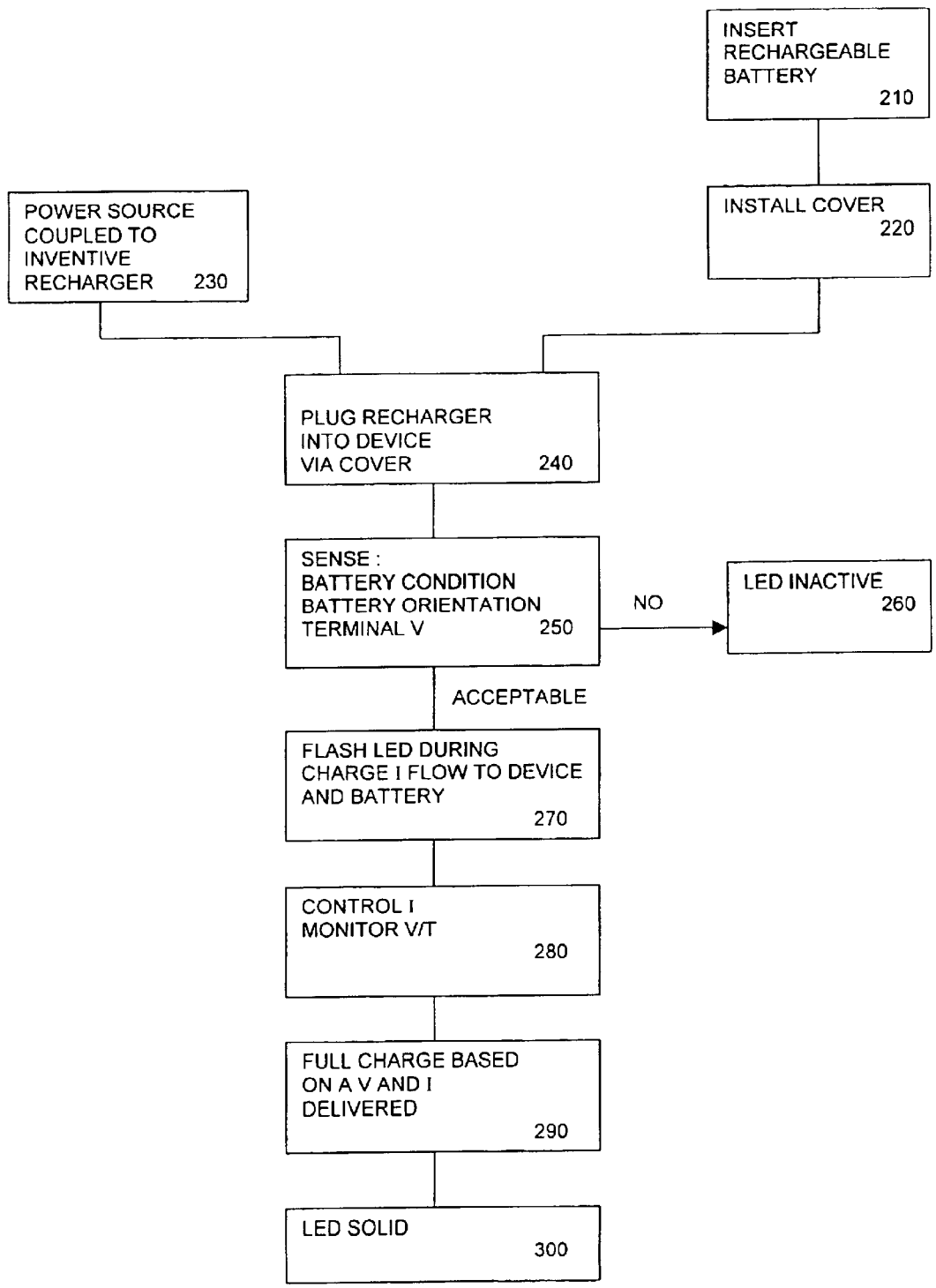
FIG. 3 is a block diagram illustrating process steps in recharging a device according to the present invention.

The process of installation and operation of the present invention in a portable electronic device intended to operate on disposable batteries is detailed in FIG. 3. The device battery cover is initially removed and a rechargeable battery pack 20 is installed instead 210. The rechargeable battery 20 illustratively includes nickel metal hydride, lithium, nickel cadmium and polymeric cells.

Preferably the rechargeable battery is nickel metal hydride. A replacement battery compartment cover 70 is installed over the rechargeable battery pack 220.

The installed cover 70 has apertures 46 and 48 therein to receive charger contacts 42 and 44 respectively therethrough aligned to engage the battery 20.

A power source such as line power, vehicle electrical power or solar cell is electrically coupled to the power adapter. In the case of an AC power source, a transformer or other conventional power modifying device having an inventive connector terminus containing an light emitting device is in electrical communication therewith 230.

The contacts extending from the recharger terminal are then coupled to the rechargeable battery 20 by passing through the cover 240.

The control circuitry within the inventive charger senses the contact with the battery prior to placing a voltage across the charger contacts. The control circuitry also verifies contact orientation is correct for battery charging and further the ability of the battery to be charged by monitoring battery terminal voltage 250.

Should these conditions fail to be sensed by the charger circuitry, charging will not occur as indicated by a charger located light emitting device failing to light 260.

If charging conditions have been met, the light emitting device 60 flashes at a steady rate indicating charging has occurred through current flow to the battery and concurrently to the device 270. During charging the circuitry controls current flow while monitoring voltage and/or temperature and/or charging duration 280.

Upon the battery attaining full charge based upon monitored voltage and delivered current 290, the charger light emitting device stays continuously lit 300.

The foregoing description is illustrative of the particular embodiments of the invention but is not meant to be a limitation upon the practice thereof. The following claims, including all equivalents, are intended to define the scope of the invention.

I claim:

1. A portable electronic device recharger comprising:
   a rechargeable battery having a power storage capacity, said battery being housed within a compartment associated with said device;
   a power source adapter that conditions source power for delivery to said rechargeable battery;
   a connector terminus in electrical communication with said power adapter, via an electrical conductor cord, said terminus electrically communicating with said rechargeable battery located with said device compartment; and
   a light emitting device affixed to at least one of said connector terminus and said rechargeable battery.

2. The device recharger of claim 1 wherein said light emitting device activation frequency indicates the charging status of said battery.

3. The device recharger of claim 1 further comprising a terminus coupling in electrical contact with said battery, said coupling adapted to engage contacts extending from said connector terminus.

4. The device recharger of claim 1 wherein said connector terminus further comprises a tab.

5. The device recharger of claim 1 wherein said connector terminus has a flared end.

6. The device recharger of claim 3 wherein there is no voltage on the connector terminus contacts absent electrical contact with the terminus coupling.

7. The device recharger of claim 3 wherein there is no voltage on said contacts absent polarity alignment between said contacts and said coupling.

8. The device recharger of claim 1 wherein electrical communication between said connector terminus and said power source adapter extends generally upwardly along a rear surface of said device.

9. The device recharger of claim 1 further comprising a battery compartment cover having an aperture therethrough at said coupling point for coupling of said battery to said charger terminal.

10. The device recharger of claim 9 wherein said cover is flush with a surface of said device.

11. The device recharger of claim 1 wherein said battery is selected from the group consisting of nickel metal hydride, lithium, nickel cadmium, and polymeric cells.

12. The device recharger of claim 1 wherein said power source adapter is coupled to a power source selected from the group consisting of line power, a vehicle electrical system, and a solar cell.

13. The device recharger of claim 1 further comprising a circuit capable of delivering current to said device while monitoring at least one parameter selected from the group consisting of voltage, current, temperature and charging duration.

14. A rechargeable battery pack comprising:

at least one rechargeable cell;

a terminus coupling adapted to couple a power source to said rechargeable cell, said terminus coupling further comprising a pair of matable sockets engageable by electrical contacts extending from said power source; and circuitry incorporated into a unit engageable with said terminus coupling that prevents current from flowing from said power source to said cell unless said power source and said cell polarity are matched and the terminal voltage of said cell is amenable to charging and thereafter delivering current to said cell while monitoring at least one parameter selected from the group including voltage, current, temperature and charging duration.

15. The battery pack of claim 14 further comprising a light emitting device charge status indicator in communication with said circuitry.

16. A detachable recharger source for a device having a rear surface comprising:

a power source adapter including a transformer/converter portion;

an insulated conductive wire extending from said adapter; and a connector terminus in electrical contact with said wire, at an end opposite said transformer/converter portion, and adapted to couple to said device in a generally normal extending direction relative to the rear surface of said device.

17. A portable electronic device recharger retrofit system comprising in combination:

a rechargeable battery having a power storage capacity, said battery being housed within a compartment associated with said device;

a power source adapter that conditions source power for delivery to said rechargeable battery;

a connector terminus in electrical communication with said power adapter, via an electrical conductor cord, said terminus electrically communicating with said rechargeable battery via a terminus coupling secured to said battery; and a compartment cover for a portable electronic device, said cover including at least one aperture formed therethrough at a coupling point in alignment with said terminus coupling and for coupling said battery to said connector terminus.

18. The system of claim 17 wherein said cover is independent of electrical contacts.

19. The system of claim 17 wherein said cover has an aperture therethrough at a coupling point for coupling of said battery to said charger terminal.

20. The system of claim 17 wherein said cover seats flush with a rear surface of said portable electronic device.

21. The system of claim 17 wherein said connector terminus has a flared end.

22. The system of claim 17 wherein said connector terminus further comprises a light emitting device.

23. The system of claim 17 wherein there is no voltage on the connector terminus contacts absent electrical contact with the terminus coupling.

24. The system of claim 17 further comprising a circuit capable of delivering current to said device while monitoring at least one parameter selected from the group consisting of voltage, current, temperature and charge duration.

* * * * *